United States Patent [19]

Su

[11] Patent Number: 5,379,527
[45] Date of Patent: Jan. 10, 1995

[54] COMBINED STEAMING AND DEHYDRATING APPARATUS

[76] Inventor: Yung S. Su, No. 170, Chung Lun, Chung Sah Tsun, An-Ting Hsiang, Tainan, Taiwan, Prov. of China

[21] Appl. No.: 181,226

[22] Filed: Jan. 13, 1994

Related U.S. Application Data

[63] Continuation-in-part of Ser. No. 24,384, Mar. 1, 1993, Pat. No. 5,311,673.

[51] Int. Cl.6 .......................................... F26B 25/18
[52] U.S. Cl. .................................... 34/197; 219/400; 99/483; 34/195
[58] Field of Search ............... 34/197, 198, 195, 196, 34/200, 238; 219/400; 99/467, 483

[56] References Cited

U.S. PATENT DOCUMENTS

| | | | |
|---|---|---|---|
| 4,190,965 | 3/1980 | Erickson | 34/197 |
| 4,236,063 | 11/1980 | Glucksman | 34/196 |
| 4,380,127 | 4/1983 | Roberts | 34/197 |
| 4,536,643 | 8/1985 | Erickson | 34/197 |
| 5,215,004 | 6/1993 | Su | 34/197 |
| 5,235,906 | 8/1993 | Hsu | 34/197 |
| 5,261,168 | 11/1993 | Li | 34/197 |

Primary Examiner—Denise L. Gromada
Attorney, Agent, or Firm—Alfred Lei

[57] ABSTRACT

A combined steaming and dehydrating apparatus including: a base having a plug and a switch electrically connected the plug; a fixing plate arranged on the base and having an outlet and an inlet; a motor mounted on the fixing plate and electrically connected the switch: an impeller drivingly connected with the motor; a conical tubular member mounted on the outlet of the fixing plate: an insulating disc installed on the conical tubular member; a water container disposed on the insulating disc; a solenoid arranged on the water container; an electric heater provided with a cross outlet at the center and mounted on the water container; a water collector disposed on the electric heater; a plurality of drying pans mounted on the water collector and each provided with a plurality of mesh holes and a plurality of legs on the top; a steaming pan mounted on the drying pan and provided with a plurality of slots and a lug at both sides for holding; a cooking pan mounted on the steaming pan and provided with a lug at both sides for holding in hand; and a cover adapted to be fitted on the cooking pan and formed on the top with a plurality of ventilating perforations.

1 Claim, 3 Drawing Sheets

COMBINED STEAMING AND DEHYDRATING APPARATUS

CROSS-REFERENCE

This application is a continuation-in-part of the U.S. Pat. application Ser. No. 08/024,384, filed Mar. 1, 1993, now U.S. Pat. No. 5,311,673.

BACKGROUND OF THE INVENTION

It has been found that the electric cooker sold in the marketplace has only one purpose. As such, it is necessary for a user to prepare a cooking pan, a drying pan, and a steaming pan thereby wasting a lot of money and furthermore, causing much inconvenience in use.

Therefore, it is an object of the present invention to provide a combined steaming and dehydrating apparatus which can obviate and mitigate the above-mentioned drawbacks.

SUMMARY OF THE INVENTION

This invention relates to a combined steaming and dehydrating apparatus.

It is the primary object of the present invention to provide a combined steaming and dehydrating apparatus which can rapidly dehydrate vegetables, fruits, or the like in a short time.

It is another object of the present invention to provide a combined steaming and dehydrating apparatus which can evenly dehydrate the vegetables, fruits, or the like.

It is still another object of the present invention to provide a combined steaming and dehydrating apparatus which can be used to steam food.

It is still another object of the present invention to provide a combined steaming and dehydrating apparatus which can be used to cook food.

It is a further object of the present invention to provide a combined steaming and dehydrating apparatus which is fit for practical use.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
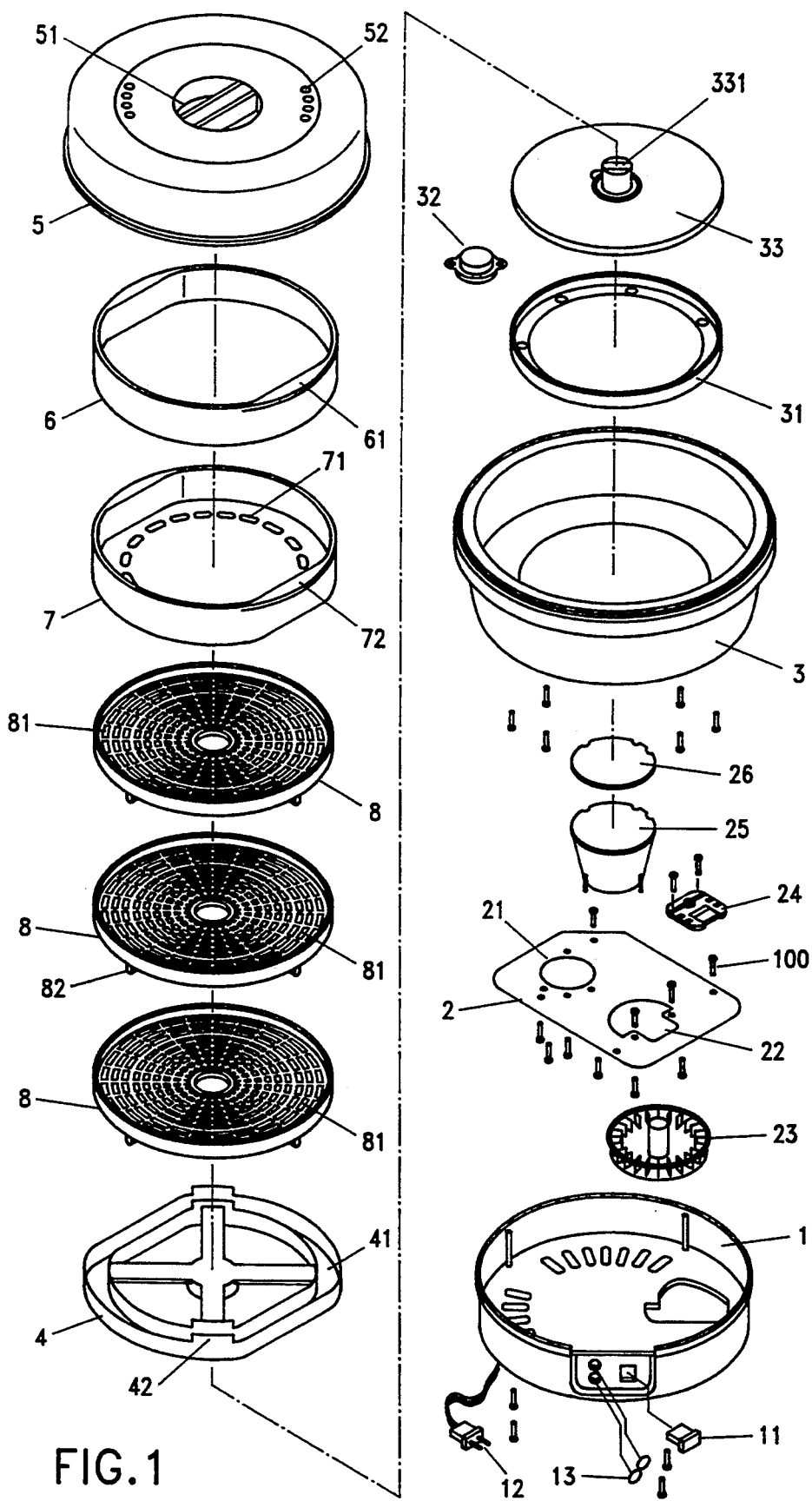
FIG. 1 is an exploded view of the present invention.
Figure 2:
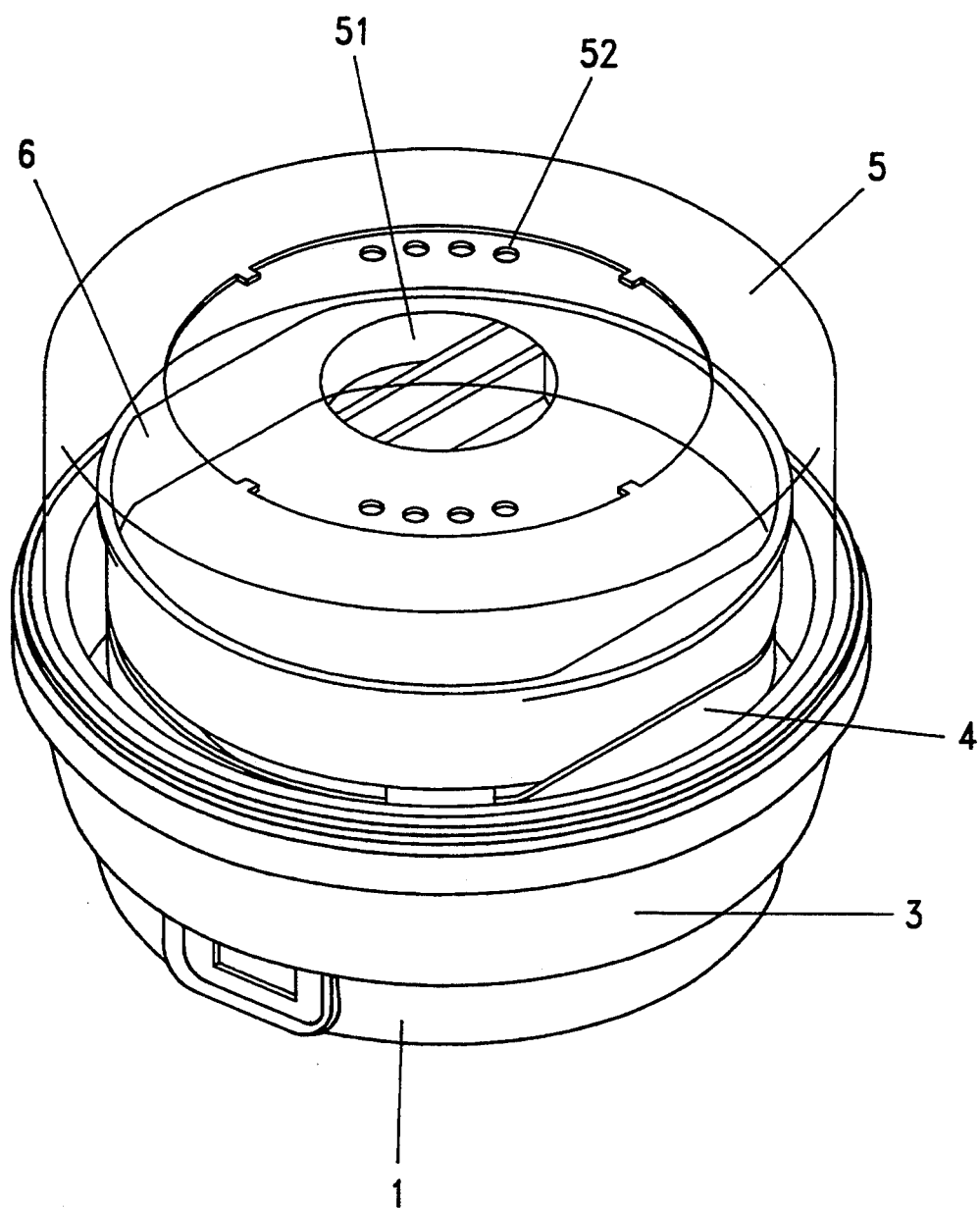
FIG. 2 is a perspective view of the present invention.
Figure 3:
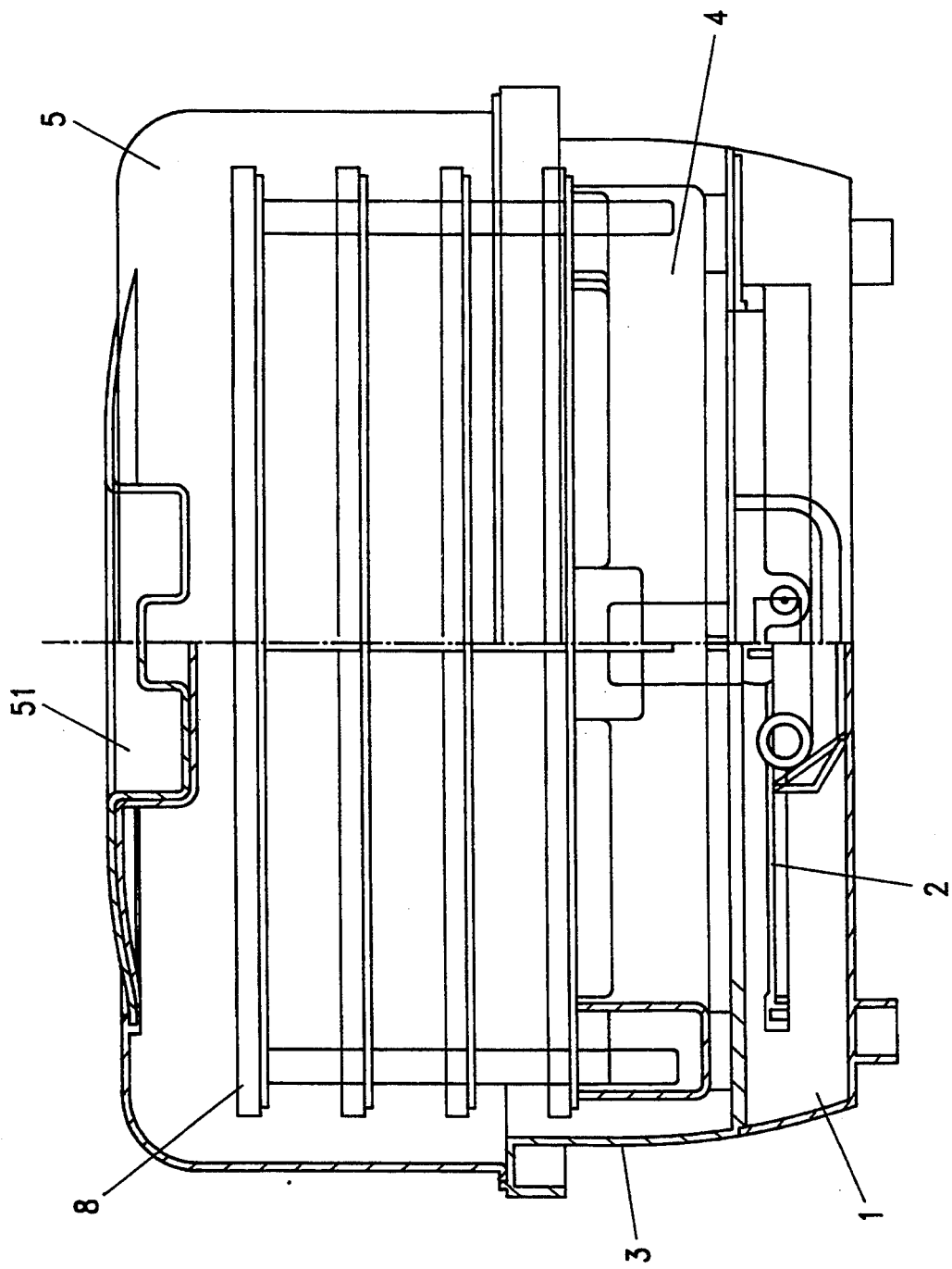
FIG. 3 shows the interior of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the combined steaming and dehydrating apparatus according to the present invention mainly comprises a base 1, a fixing plate 2, an impeller 23, a conical tubular member 25, a water container 3, a solenoid 31, an electric heater 33, a water collector 4, three drying pans 8, a steaming pan 7, a cooking pan 6, and a cover 5.

The base 1 is provided with a switch 11, an indicating light 13, and an electrical cord with a plug 12.

The fixing plate 2 is arranged on the base 1 by screws 100 and has an outlet 21 and an inlet 22. On the fixing plate 2 there is mounted a motor 24 which is drivingly connected with the impeller 23. On the outlet 21 of the fixing plate 2 is mounted a conical member 25 on which is fitted an insulating disc 26.

The water container 3 is disposed on the insulating disc 26.

The solenoid 31 is arranged in the water container 3.

The electric heater 33 is provided with a cross outlet 331 at the center and is mounted on the solenoid 31.

A temperature switch 32 is mounted under the electric heater 33.

The water collector 4 is disposed on the electric heater 33 and is provided with an annular groove 41 and protuberances 42 on the top.

The drying pans 8 are mounted on the water collector 4 and are each provided with a plurality of mesh holes 81 and a plurality of legs 82 on its bottom.

The steaming pan 7 is mounted on the drying pan 8 and is provided with a plurality of slots 71 and a lug 72 at both sides for holding.

The cooking pan 6 is mounted on the steaming pan 7 and is provided with a lug 61 at both sides for holding in the hand.

The cover 5 is adapted to be mounted on the cooking pan 6 and is formed on the top with a recess 51 in which is fitted a handle. Further, the top of the cover 5 has a plurality of ventilating perforations 52 which are divided into two groups in this preferred embodiment.

When desired to use the present invention as a dehydrator, simply place the vegetables, fruits or the like to be dried on the drying pans 8, and then turn on the switch 11 electrically connected with the motor 24 and the electric heater 33. Further, when required to adjust the flow rate of the hot air, just turn the cover 5 to selectively align the perforations 52 of the cover 5 with the perforations 52 of the cover. As the motor 24 rotates, the impeller 23 will force the air to flow upwardly through the electric heater 33 thereby heating the air. Then, the heated air will dry the vegetables, fruits, etc. on the drying pans 8.

When desired to use the present invention for steaming food, simply remove the drying pans 8 and the cooking pan 6, pour water into the water container 3 and turn on the switch 11.

When desired to use the present invention for cooking food, it is only necessary to remove the drying pans 8 and the steaming pan 7, put the cooking pan 6 directly on the electric heater 33, and turn on the switch 11.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A combined steaming and dehydrating apparatus comprising:
   - a base having a plug and a switch electrically connected to the plug;
   - a fixing plate arranged on said base and having an outlet and an inlet;
   - a motor mounted on said fixing plate and electrically connected to said switch;
   - an impeller drivingly connected with said motor;
   - a conical tubular member mounted on the outlet of said fixing plate;
   - an insulating disc installed on said conical tubular member;
   - a water container disposed on said insulating disc;
   - a solenoid arranged on said water container;
   - an electric heater provided with a cross outlet at the center and mounted on said solenoid;
   - a water collector disposed on said electric heater;
   - a plurality of drying pans mounted on said water collector and each provided with a plurality of mesh holes and a plurality of legs on the top;
   - a steaming pan mounted on said drying pan and provided with a plurality of slots and a lug at both sides for holding;
   - a cooking pan mounted on said steaming pan and provided with a lug at both sides for holding in hand; and
   - a cover adapted to be fitted on said cooking pan and formed on the top with a plurality of ventilating perforations.

* * * * *